US010879629B2

(12) United States Patent
Nian et al.

(10) Patent No.: US 10,879,629 B2
(45) Date of Patent: Dec. 29, 2020

(54) METHOD OF ELECTROPLATING METAL INTO RECESSED FEATURE AND ELECTROPLATING LAYER IN RECESSED FEATURE

(71) Applicant: TAIWAN SEMICONDUCTOR MANUFACTURING COMPANY LIMITED, Hsin-Chu (TW)

(72) Inventors: Jun-Nan Nian, Tainan (TW); Jyun-Ru Wu, Tainan (TW); Shiu-Ko Jangjian, Tainan (TW); Yu-Ren Peng, Tainan (TW); Chi-Cheng Hung, Tainan (TW); Yu-Sheng Wang, Tainan (TW)

(73) Assignee: TAIWAN SEMICONDUCTOR MANUFACTURING COMPANY LIMITED, Hsin-Chu (TW)

( * ) Notice: Subject to any disclaimer, the term of this patent is extended or adjusted under 35 U.S.C. 154(b) by 51 days.

(21) Appl. No.: 16/205,286

(22) Filed: Nov. 30, 2018

(65) Prior Publication Data

US 2019/0109389 A1 Apr. 11, 2019

Related U.S. Application Data

(62) Division of application No. 15/132,099, filed on Apr. 18, 2016, now Pat. No. 10,749,278.

(Continued)

(51) Int. Cl.
*C25D 5/16* (2006.01)
*H01R 4/2433* (2018.01)
(Continued)

(52) U.S. Cl.
CPC ............ *H01R 4/2433* (2013.01); *C25D 3/38* (2013.01); *C25D 5/16* (2013.01); *C25D 7/00* (2013.01);
(Continued)

(58) Field of Classification Search
None
See application file for complete search history.

(56) References Cited

U.S. PATENT DOCUMENTS 6,297,155 B1 10/2001 Simpson et al.
6,946,065 B1 * 9/2005 Mayer ............... C25D 3/02
205/102

(Continued)

FOREIGN PATENT DOCUMENTS

| CN | 1867703 A | 11/2006 |
| CN | 102362013 A | 2/2012 |
| CN | 103103584 A | 5/2013 |

OTHER PUBLICATIONS

Reid, et al., "Optimization of Damascene Feature Fill for Copper Electroplating Process", Proceedings of the IEEE 1999 Interconnect Technology Conference, May 1999, pp. 284-286.

*Primary Examiner* — Stefanie S Wittenberg
(74) *Attorney, Agent, or Firm* — Cooper Legal Group, LLC

(57) ABSTRACT

A method of electroplating a metal into a recessed feature is provided, which includes: contacting a surface of the recessed feature with an electroplating solution comprising metal ions, an accelerator additive, a suppressor additive and a leveler additive, in which the recessed feature has at least two elongated regions and a cross region laterally between the two elongated regions, and a molar concentration ratio of the accelerator additive:the suppressor additive:the leveler additive is (8-15):(1.5-3):(0.5-2); and electroplating the metal to form an electroplating layer in the recessed feature. An electroplating layer in a recessed feature is also provided.

20 Claims, 2 Drawing Sheets

Related U.S. Application Data

(60) Provisional application No. 62/279,180, filed on Jan. 15, 2016.

(51) Int. Cl.
   *C25D 7/12*      (2006.01)
   *H02G 3/08*      (2006.01)
   *C25D 3/38*      (2006.01)
   *C25D 7/00*      (2006.01)
   *H01R 13/506*    (2006.01)
   *H02G 15/06*     (2006.01)

(52) U.S. Cl.
   CPC ........... *C25D 7/123* (2013.01); *H01R 13/506* (2013.01); *H02G 3/081* (2013.01); *H02G 15/06* (2013.01)

(56) References Cited

U.S. PATENT DOCUMENTS

| | | |
|---|---|---|
| 7,692,315 B2 | 4/2010 | Watanbe et al. |
| 8,454,815 B2 | 6/2013 | Niazimbetova et al. |
| 10,132,699 B1* | 11/2018 | Pillars .................... G01L 1/106 |
| 2005/0081744 A1 | 4/2005 | Klocke et al. |
| 2005/0173255 A1* | 8/2005 | Bokisa ................... C25D 3/562 |
| | | 205/255 |
| 2010/0126872 A1 | 5/2010 | Paneccasio, Jr. et al. |
| 2011/0139626 A1* | 6/2011 | Saito ....................... H05K 1/09 |
| | | 205/50 |
| 2013/0098770 A1 | 4/2013 | Niazimbetova et al. |
| 2016/0273117 A1* | 9/2016 | Doubina ............. C25D 17/001 |

\* cited by examiner

METHOD OF ELECTROPLATING METAL INTO RECESSED FEATURE AND ELECTROPLATING LAYER IN RECESSED FEATURE

RELATED APPLICATIONS

This application is a divisional of and claims priority to U.S. Non-Provisional application Ser. No. 15/132,099, titled "METHOD OF ELECTROPLATING METAL INTO RECESSED FEATURE AND ELECTROPLATING LAYER IN RECESSED FEATURE" and filed on Apr. 18, 2016, which claims priority to U.S. Provisional Application Ser. No. 62/279,180, titled, "METHOD FOR CONTROL SPECIFIC PATTERN TO AVOID OVER HANG" and filed on Jan. 15, 2016. U.S. Non-Provisional application Ser. No. 15/132,099 and U.S. Provisional Application Ser. No. 62/279,180 are incorporated herein by reference.

BACKGROUND

Forming electrically conducting vias, contacts, and conductors of copper or other metals becomes increasingly challenging as feature sizes are reduced. Techniques for forming such metal features include physical vapor deposition (PVD), chemical vapor deposition (CVD), plasma enhanced chemical vapor deposition (PECVD) and electrochemical deposition (also referred to as electroplating or electrodeposition).

The general nature of the electroplating process is well known. The wafer is immersed in an electrolytic bath containing metal ions and is biased as the cathode in an electric circuit. With the solution biased positively, the metal ions become current carriers, which flow towards and are deposited on the exposed surfaces of the wafer. Electroplating is particularly well suited for the formation of small embedded damascene metal features due to the ability to readily control the growth of the electroplated film for bottom-up filling, and due to the superior electrical conductivity characteristics of the electroplated film. However, there are also several obstacles, which need to be overcome to fully realize these advantages.

One challenge facing damascene processing techniques is the difficulty of the growth of the metal film within recessed features without forming voids. Voids increase the resistance of the conductor. Also, trapped electroplating solution in sealed voids may corrode the metal. This may lead to degraded device performance or device failure in extreme cases.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1A in accordance with some embodiments of the present disclosure.

DETAILED DESCRIPTION

Figure 1A:
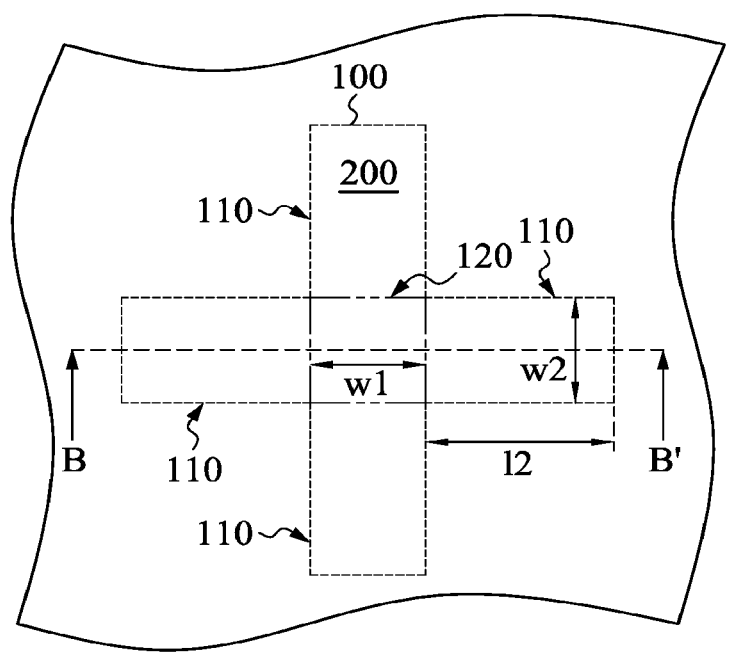
FIG. 1A is a top view of a recessed feature in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As mentioned above, one challenge facing damascene processing techniques is the difficulty of the growth of the metal film within recessed features without forming voids. For example, when electroplating a metal in a small size recessed feature having a cross region (e.g., L-shaped, T-shaped, X-shaped, V-shaped or Z-shaped recessed feature in top view), a void space is easily formed in the cross region, and some electroplating solution is accommodated in the void space, which will result in negative impact on device performance. This issue will be described in detail below.

Figure 1B:
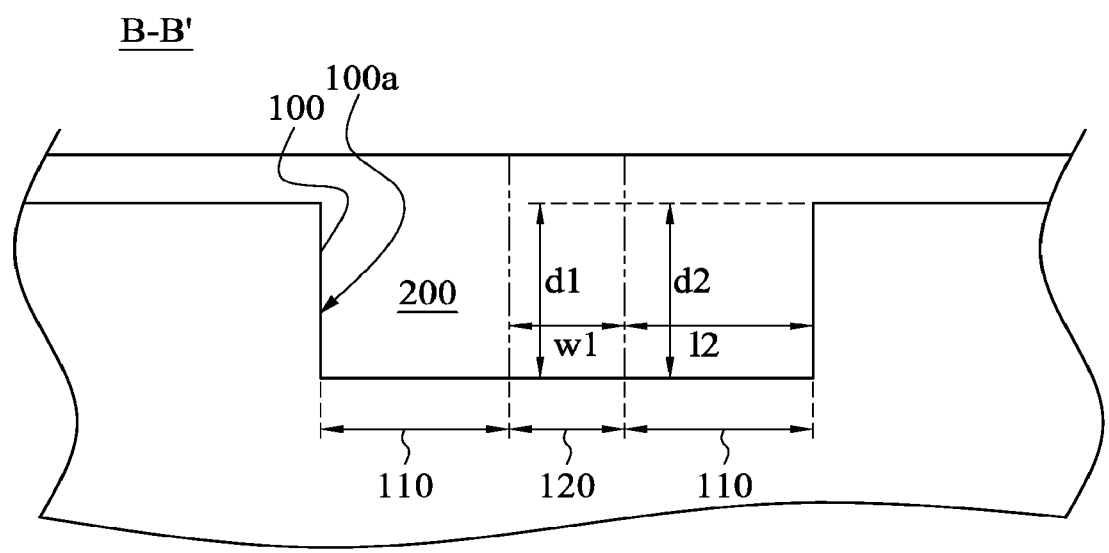
FIG. 1B is a cross-sectional view of the recessed feature taken along a section line BB' of FIG.

Referring to FIG. 1A, which is a top view of a recessed feature 100 in accordance with some embodiments of the present disclosure. The recessed feature 100 of FIG. 1A is an X-shaped (or called as cross-shaped) recessed feature. Referring to FIG. 1B, which is a cross-sectional view of the recessed feature 100 taken along a section line BB' of FIG. 1A in accordance with some embodiments of the present disclosure. As shown in FIGS. 1A and 1B, the recessed feature 100 has at least two elongated regions 110 and a cross region 120 connected laterally between the two elongated regions 110. Specifically, the recessed feature 100 has four elongated regions 110, and one of the four elongated regions 110 is connected to another of the four elongated regions 110 through the cross region 120. In some embodiments, the cross region 120 is defined by four corners between the four elongated regions 110. In some embodiments, the cross region 120 is restricted by four corners, and any one of the four elongated regions 110 is restricted by three sidewalls. Therefore, the cross region 120 has less restriction than that of the elongated region 110.

In some embodiments, as shown in FIG. 1A, the cross region 120 has a width w1 less than or equal to 50 nm, 40 nm, 30 nm, 20 nm or 10 nm. In some embodiments, as shown in FIG. 1B, the cross region 120 has a depth d1 greater than or equal to 50 nm, 100 nm, 150 nm, 200 nm, 250 nm or 300 nm. In some embodiments, the elongated region 110 has a depth d2 less than or equal to the depth d1 of the cross region 120, but not limited thereto.

Referring to FIGS. 1A and 1B, when electroplating the metal into such small size recessed feature 100, the metal is firstly formed over a wall of the recessed feature 100. More specifically, in some embodiments, the metal is firstly formed over sidewalls of the four elongated regions 110 and bottom surfaces of the four elongated regions 110, and the metal is then formed towards the cross region 120 from the four elongated regions 110.

However, the metal formed from one of the four elongated regions 110 towards the cross region 120 may touch the metal formed from another of the four elongated regions 110 towards the cross region 120 at top of the cross region 120, which will result in a void space formed adjacent to the bottom of the cross region 120 and filled with trapped electroplating solution. In some embodiments, the trapped electroplating solution in the void space of the cross region 120 of the recessed feature 100 will cause the die to be failed in a wafer acceptance test (WAT).

Therefore, the present disclosure provides a method of electroplating the metal into such recessed feature (e.g., the small size recessed feature 100 of FIGS. 1A and 1B) free of void space by controlling a composition ratio of components of an electroplating solution. Embodiments of the method and embodiments of the electroplating solution will be described in detail below.

For example, as shown in FIG. 1B, a surface 100a of the recessed feature 100 is firstly in contact with an electroplating solution (not shown), which includes metal ions, an accelerator additive, a suppressor additive and a leveler additive. Subsequently, the metal is electroplated to form an electroplating layer 200 in the recessed feature 100. Electroplating involves making electrical contact with the surface 100a of the recessed feature 100 upon which the electroplating layer 200 is to be deposited. Current is then passed through the electroplating solution between an anode and the surface 100a of the recessed feature 100 (the surface 100a of the recessed feature 100 being the cathode). This causes an electrochemical reaction on the surface 100a of the recessed feature 100, which results in the deposition of the electroplating layer 200.

In some embodiments, the recessed feature 100 has a seed layer (not shown) exposed from the surface 100a of the recessed feature 100. In some embodiments, the seed layer is a metal seed layer, such as copper, which is applied prior to electrochemically depositing the metal. In some embodiments, such seed layer may be applied by a variety of methods, such as physical vapor deposition ("PVD"; which includes sputtering, evaporation, or deposition from ionized metal plasma of hollow cathode magnetron sources) and chemical vapor deposition ("CVD", which includes deposition from metal or organometallic precursors including one of more metal atoms in combination with inorganic or organic ligands such as halides, pseudohalides, carbonyls, nitriles, alkyls, olefins, allyls, arenes, phosphines, amines, and the like). In some embodiments, the seed layer has a thickness in a range of 50 angstroms to 500 angstroms.

In some embodiments, the electroplating solution includes the metal ions to be electroplated and the associated anions in an acid solution. In some embodiments, the metal ions include copper ions. In some embodiments, a variety of copper salts may be employed in the present electroplating solution, including for example copper sulfate, copper sulfonate, copper acetate, copper gluconate, copper fluoroborate, cupric nitrate, copper alkanesulfonates and copper arylsulfonates. In some embodiments, copper electroplating is performed from a solution of copper sulfate dissolved in an aqueous solution of sulfuric acid. In some embodiments, copper alkanesulfonate includes copper methane sulfonate and copper ethanesulfonate. In some embodiments, copper arylsulfonate includes copper phenylsulfonates and copper tolylsulfonate. Mixtures of copper salts may also be used. The copper salt may be used in the present electroplating solution in a relatively wide concentration range. In some embodiments, the copper salt is present in an amount sufficient to provide an amount of copper ions of 10 to 180 g/L in the electroplating solution. In some embodiments, the copper salt provides an amount of copper ions of 15 to 65 g/L in the electroplating solution. In some embodiments, the copper electroplating solution further contains amounts of other alloying elements, such as, but not limited to, tin, zinc, indium, antimony, and the like. Such alloying elements are added to the electroplating solution in the form of any suitable bath-solution salt. Thus, the copper electroplating solution useful in the present disclosure may deposit copper or copper alloy. In some embodiments, the electroplating solution includes ppm levels of chloride ions. In some embodiments, the acid used as the electrolyte includes sulfuric acid, nitric acid, methanesulfonic acid, phenylsulfonic acid, mixtures of sulfuric acid and methanesulfonic acid, mixtures of methanesulfonic acid and phenylsulfonic acid, and mixtures of sulfuric acid, methanesulfonic acid and phenylsulfonic acid.

In some embodiments, the accelerator additive is configured to increase the rate of the electroplating reaction. In some embodiments, the accelerator additive is a molecule, which adsorb on surfaces and increase the local current density at a given applied voltage. In some embodiments, the accelerator additive contains pendant sulfur atoms, which is configured to participate in the cupric ion reduction reaction and thus strongly influence the nucleation and surface growth of metal films. In some embodiments, the accelerator additive includes bis-(3-sulfopropyl) disulfide (SPS), mercaptopropanesulfonic acid (MPS), dimercaptopropanesulfonic acid (DPS), ethylenedithiodipropyl sulfonic acid, bis-(ω-sulfobutyl)-disulfide, methyl-(ω-sulfopropyl)-disulfide, N,N-dimethyldithiocarbamic acid (3-sulfopropyl) ester, (O-ethyldithiocarbonato)-S-(3-sulfopropyl)-ester, 3-[(amino-iminomethyl)-thiol]-1-propanesulfonic acid, 3-(2-benzylthiazolylthio)-1-propanesulfonic acid, bis-(sulfopropyl)-disulfide, alkali metal salts thereof, its derivatives or a combination thereof. In some embodiments, the accelerator additive, for example, SPS, in the electroplating solution includes negative divalent ions. In some embodiments, the accelerator additive has a molecular weight of 50 to 400. In some embodiments, the accelerator additive has a molecular weight of 100 to 300. In some embodiments, the accelerator additive has a molar concentration of 3 mol/L to 20 mol/L. In some embodiments, the accelerator additive has a molar concentration of 8 mol/L to 15 mol/L.

In some embodiments, the suppressor additive is a polymer and configured to decrease the local current density at a given applied voltage, thus retarding electroplating. In some embodiments, the suppressor additive includes a polyether compound. In some embodiments, the suppressor additive includes polyalkylene oxide random copolymers including as polymerized units two or more alkylene oxide monomers. In some embodiments, the suppressor additive includes ethylene oxide-propylene oxide random copolymers. In some embodiments, the suppressor additive is derived from polyethylene oxide (PEO), polypropylene oxide (PPO), polyethylene glycol (PEG), polypropylene glycol (PPG), or their derivatives or co-polymers. In some embodiments, the suppressor additive has a molecular weight less than or equal to 1,000. In some embodiments, the suppressor additive has a molecular weight of 300 to 1,000. In some embodiments, the suppressor additive has a molecular weight of 400 to 1,000. In some embodiments, the suppressor additive has a molar concentration of 1 mol/L to 4 mol/L. In some embodiments, the suppressor additive has a molar concentration of 1.5 mol/L to 3 mol/L.

In some embodiments, the leveler additive refers to an organic additive that is capable of providing a substantially planar metal electroplating layer. In some embodiments, the leveler additive contains one or more nitrogen, amine, imide, imidazole or pyrrolidone, and may also contain sulfur functional groups. In some embodiments, certain leveler additive includes one or more five and six member rings and/or conjugated organic compound derivatives. In some embodiments, nitrogen groups may form part of the ring structure. In some embodiments, in the amine-containing leveler additives, the amines are primary, secondary or tertiary alkyl amines. In some embodiments, the amine is an aryl amine or a heterocyclic amine. In some embodiments, the amines include, but are not limited to, dialkylamines, trialkylamines, arylalkylamines, triazoles, imidazole, triazole, tetrazole, benzimidazole, benzotriazole, piperidine, morpholines, piperazine, pyridine, pyrrolidone, oxazole, benzoxazole, pyrimidine, quonoline, and isoquinoline. In some embodiments, the leveler additive includes polyvinylpyrrolidone (PVP). In some embodiments, the leveler additive has a molecular weight of 2,500 to 600,000. In some embodiments, the leveler additive has a molecular weight of 3,500 to 500,000. In some embodiments, the accelerator additive has a molar concentration of 0.25 mol/L to 3 mol/L. In some embodiments, the accelerator additive has a molar concentration of 0.5 mol/L to 2 mol/L.

In some embodiments, a molecular weight of the accelerator additive is less than a molecular weight of the suppressor additive or a molecular weight of the leveler additive. The accelerator additive having lower molecular weight tends to adsorb on sidewalls (e.g., sidewalls of the elongated regions 110 of FIG. 1A) and bottom surfaces of the recessed feature 100 to increase the rate of the electroplating reaction in the elongated regions 110, and the suppresser additive and the leveler additive having greater molecular weight may be pushed to the cross region 120, resulting in retardation of electroplating reaction in the cross region 120. As such, the void space is easily formed in the cross region 120.

Therefore, in some embodiments, the molar concentration of the accelerator additive is greater than the molar concentration of the suppressor additive. In some embodiments, the molar concentration of the accelerator additive is 2 to 10 times the molar concentration of the suppressor additive. Since the molar concentration of the accelerator additive is greater than the molar concentration of the suppressor additive, the amount of the suppressor additive in the cross region 120 will be decreased to reduce suppression of the metal ions reduction in the cross region 120. As such, the cross region 120 is easily to be filled without forming void space. In some embodiments, the formed electroplating layer 200 in the small size recessed feature 100 has a very low atomic ratio of carbon to metal due to free of void space and trapped electroplating solution. In some embodiments, the atomic ratio of the carbon to the metal is less than or equal to 0.1. In some embodiments, the atomic ratio of the carbon to the metal is less than or equal to 0.09, 0.08 or 0.07. In some embodiments, the atomic ratio of the carbon to the metal of the electroplating layer 200 is detected by energy dispersive X-ray spectroscopy (EDX).

In some embodiments, the molar concentration of the accelerator additive is greater than the molar concentration of the leveler additive. In some embodiments, the molar concentration of the accelerator additive is 4 to 30 times the molar concentration of the leveler additive. In some embodiments, the molar concentration of the suppressor additive is greater than or equal to the molar concentration of the leveler additive. In some embodiments, the molar concentration of the suppressor additive is 1 to 6 times the molar concentration of the leveler additive.

In some embodiments, a molar concentration ratio of the accelerator additive:the suppressor additive:the leveler additive is (3-20):(1-4):(0.25-3) to reduce retardation of the electroplating reaction in the cross region 120. In some embodiments, a molar concentration ratio of the accelerator additive:the suppressor additive:the leveler additive is (8-15):(1.5-3):(0.5-2) to reduce retardation of the electroplating reaction in the cross region 120.

The present application further provides an electroplating layer in a recessed feature. For example, as shown in FIGS. 1A and 1B, the electroplating layer 200 includes metal (e.g., copper) and carbon, and an atomic ratio of the carbon to the metal of the electroplating layer 200 is less than or equal to 0.1. In some embodiments, the atomic ratio of the carbon to the metal is less than or equal to 0.09, 0.08 or 0.07. In some embodiments, the atomic ratio of the carbon to the metal of the electroplating layer 200 is detected by energy dispersive X-ray spectroscopy. In some embodiments, the electroplating layer 200 is free of void space. In some embodiments, the electroplating layer 200 is free of trapped electroplating solution. In some embodiments, the atomic ratio of the carbon to the metal is quite low since there is no void space and trapped electroplating solution in the electroplating layer 200.

Referring to FIGS. 1A and 1B, the recessed feature 100 has at least two elongated regions 110 and a cross region 120 connected laterally between the two elongated regions 110, and the electroplating layer 200 is in the recessed feature 100. Specifically, the recessed feature 100 has four elongated regions 110, and one of the four elongated regions 110 is connected to another of the four elongated regions 110 through the cross region 120. In some embodiments, the cross region 120 is defined by four corners between the four elongated regions 110.

The cross region 120 has a width w1 greater than or equal to a width w2 of one of the two elongated regions 110. In some embodiments, the width w1 of the cross region 120 is less than or equal to 50 nm, 40 nm, 30 nm, 20 nm or 10 nm. In some embodiments, the width w1 of the cross region 120 is equal to the width w2 of the one of the two elongated regions 110, as shown in FIG. 1A.

Figure 2:
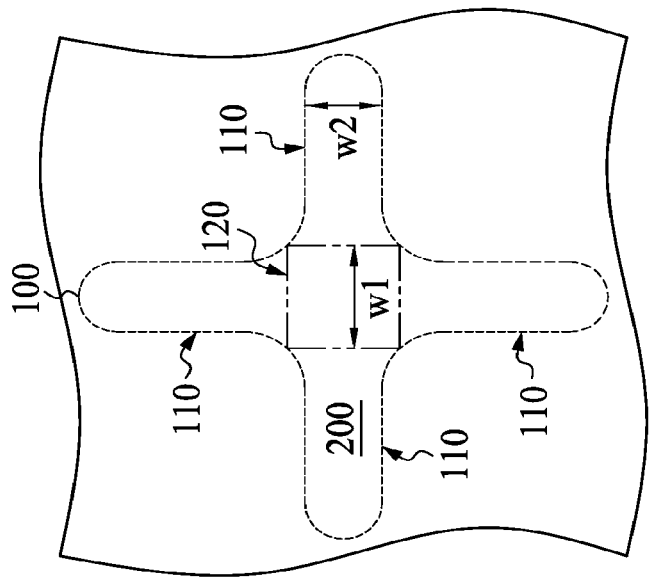
FIG. 2 is a top view of a recessed feature in accordance with some embodiments of the present disclosure.

In other embodiments, as shown in FIG. 2, which is a top view of a recessed feature in accordance with some embodiments of the present disclosure, a width w1 of the cross region 120 is greater than a width w2 of the elongated region 110. The direction of the width w2 is vertical or substantially vertical to an extending direction of the elongated region 110 in top view. In some embodiments, at least one of the elongated regions 110 has various widths (i.e., w2). In some embodiments, the cross region 120 is defined by mid points of four curved corners between the four elongated regions 110.

Figure 3:
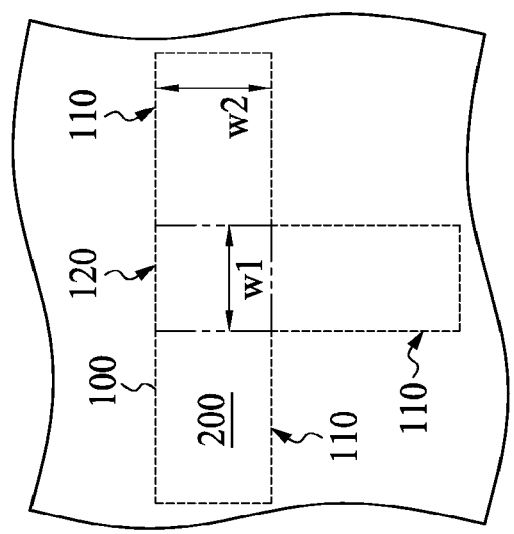
FIG. 3 is a top view of a recessed feature in accordance with some embodiments of the present disclosure.

In some embodiments, the recessed feature 100 is L-shaped, T-shaped, X-shaped, V-shaped or Z-shaped in top view. In some embodiments, as shown in FIG. 3, which is a top view of a T-shaped recessed feature in accordance with some embodiments of the present disclosure. The T-shaped recessed feature has three elongated regions 110, and one of the three elongated regions 110 is connected to another of the three elongated regions 110 through the cross region 120. In some embodiments, the cross region 120 is defined by two corners between the three elongated regions 110 and extension lines from the corners to the opposite edge of the recessed feature 100.

Figure 4:
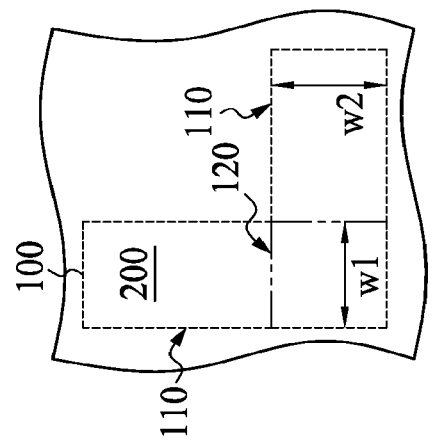
FIG. 4 is a top view of a recessed feature in accordance with some embodiments of the present disclosure.

In some embodiments, as shown in FIG. 4, which is a top view of an L-shaped recessed feature in accordance with some embodiments of the present disclosure. The L-shaped recessed feature has two elongated regions 110, and one of the two elongated regions 110 is connected to the other of the two elongated regions 110 through the cross region 120. In some embodiments, the cross region 120 is defined by one corner between the two elongated regions 110 and extension lines from the corner to the two opposite edges of the recessed feature 100.

In some embodiments, as shown in FIG. 1B, the cross region 120 has a depth $d_1$ greater than or equal to 50 nm, 100 nm, 150 nm, 200 nm, 250 nm or 300 nm. In some embodiments, the cross region 120 has an aspect ratio greater than or equal to 1. In some embodiments, the aspect ratio of the cross region 120 is in a range of 1 to 30. In some embodiments, the greater the depth $d_1$ or the aspect ratio of the cross region 120, the harder the metal to be filled in the cross region 120 without void space is.

In some embodiments, a ratio of the depth $d_1$ of the cross region 120 to a length $l_2$ of one of the two elongated regions 110 is greater than or equal to 1.5, 1.25, 1.0, 0.75, 0.5 or 0.25, but not limited thereto. In some embodiments, the ratio of the depth $d_1$ of the cross region 120 to the length $l_2$ of one of the two elongated regions 110 is in a range of 0.25 to 6. In some embodiments, the length $l_2$ of one of the two elongated regions 110 is greater than or equal to the width $w_1$ of the cross region 120.

The present application also provides another electroplating layer in a recessed feature. As shown in FIGS. 1A and 1B, the electroplating layer 200 includes metal (e.g., copper) and carbon, and an atomic ratio of the carbon to the metal of the electroplating layer 200 is less than or equal to 0.1. In some embodiments, the atomic ratio of the carbon to the metal is less than or equal to 0.09, 0.08 or 0.07. In some embodiments, the atomic ratio of the carbon to the metal of the electroplating layer 200 is detected by energy dispersive X-ray spectroscopy. In some embodiments, the electroplating layer 200 is free of void space. In some embodiments, the electroplating layer 200 is free of trapped electroplating solution. In some embodiments, the atomic ratio of the carbon to the metal is quite low since there is no void space and trapped electroplating solution in the electroplating layer 200.

Referring to FIGS. 1A and 1B, the recessed feature 100 has at least two elongated regions 110 and a cross region 120 connected laterally between the two elongated regions 110, and the electroplating layer 200 is in the recessed feature 100. Specifically, the recessed feature 100 has four elongated regions 110, and one of the four elongated regions 110 is connected to another of the four elongated regions 110 through the cross region 120. In some embodiments, the cross region 120 is defined by four corners between the four elongated regions 110.

A ratio of a depth $d_1$ of the cross region 120 to a length $l_2$ of one of the two elongated regions 120 is greater than or equal to 0.5. In some embodiments, the ratio of the depth $d_1$ of the cross region 120 to the length $l_2$ of the one of the two elongated regions 110 is greater than or equal to 1. In some embodiments, the ratio of the depth $d_1$ of the cross region 120 to the length $l_2$ of the one of the two elongated regions 110 is greater than or equal to 1.5. In some embodiments, the length $l_2$ of the one of the two elongated regions 110 is greater than or equal to a width $w_1$ of the cross region 120.

In some embodiments, the cross region 120 has a width $w_1$ less than or equal to 50 nm, 40 nm, 30 nm, 20 nm or 10 nm. In some embodiments, the recessed feature 100 is L-shaped (shown in FIG. 4), T-shaped (shown in FIG. 3), X-shaped (shown in FIG. 1A), V-shaped or Z-shaped in top view.

According to some embodiments, a method of electroplating a metal into a recessed feature includes: contacting a surface of the recessed feature with an electroplating solution including metal ions, an accelerator additive, a suppressor additive and a leveler additive, in which the recessed feature has at least two elongated regions and a cross region laterally between the two elongated regions, and a molar concentration ratio of the accelerator additive: the suppressor additive:the leveler additive is (8-15):(1.5-3):(0.5-2); and electroplating the metal to form an electroplating layer in the recessed feature.

According to some embodiments, an electroplating layer is in a recessed feature and includes metal and carbon, and the recessed feature has at least two elongated regions and a cross region laterally between the two elongated regions, and the cross region has a width greater than or equal to a width of one of the two elongated regions, in which an atomic ratio of the carbon to the metal is less than or equal to 0.1.

According to some embodiments, an electroplating layer is in a recessed feature and includes metal and carbon, and the recessed feature has at least two elongated regions and a cross region laterally between the two elongated regions, and a ratio of a depth of the cross region to a length of one of the two elongated regions is greater than or equal to 0.5, in which an atomic ratio of the carbon to the metal is less than or equal to 0.1.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of electroplating a metal into a recessed feature, the method comprising:
   contacting a surface of the recessed feature with an electroplating solution comprising metal ions, an accelerator additive, a suppressor additive, and a leveler additive, wherein:

the recessed feature has:
a first elongated region extending between a first sidewall, a second sidewall, and a first end wall extending between the first sidewall and the second sidewall,
a second elongated region extending between a third sidewall, a fourth sidewall, and a second end wall extending between the third sidewall and the fourth sidewall, and
a cross region laterally between the first elongated region and the second elongated region,
a width of the cross region is less than or equal to 50 nm,
the first sidewall is not parallel to the third sidewall and the fourth sidewall,
the second sidewall is not parallel to the third sidewall and the fourth sidewall,
the first end wall is different than the second end wall,
a molar concentration ratio of the accelerator additive:the suppressor additive:the leveler additive is (8-15):(1.5-3):(0.5-2), and
a molar concentration of the suppressor additive is in a range of 1.5 mol/L to 3 mol/L; and
electroplating the metal into the recessed feature using the electroplating solution to form an electroplating layer in the recessed feature, wherein:
the electroplating layer comprises the metal and carbon,
an atomic ratio of the carbon to the metal is less than or equal to 0.1, and
the electroplating layer is free of void space.

2. The method of claim 1, wherein a molecular weight of the accelerator additive is less than a molecular weight of the suppressor additive.

3. The method of claim 1, wherein a molecular weight of the accelerator additive is less than a molecular weight of the leveler additive.

4. The method of claim 1, wherein the cross region has a depth greater than or equal to 50 nm.

5. The method of claim 1, wherein the cross region has a depth greater than a depth of the first elongated region.

6. The method of claim 1, wherein contacting the surface of the recessed feature with the electroplating solution comprises contacting the surface with the electroplating solution prior to electroplating the metal.

7. The method of claim 1, comprising:
applying a seed layer to the surface prior to contacting the surface with the electroplating solution.

8. The method of claim 1, wherein the accelerator additive is absorbed by the surface.

9. The method of claim 1, wherein the metal ions comprise copper and at least one of tin, zinc, indium, or antimony.

10. A method of electroplating copper into a recessed feature, the method comprising:
contacting a surface of the recessed feature with an electroplating solution comprising copper ions, an accelerator additive, a suppressor additive, and a leveler additive, wherein:
the recessed feature has:
a first elongated region extending between a first sidewall, a second sidewall, and a first end wall extending between the first sidewall and the second sidewall,
a second elongated region extending between a third sidewall, a fourth sidewall, and a second end wall extending between the third sidewall and the fourth sidewall, and
a cross region laterally between the first elongated region and the second elongated region,
a width of the cross region is less than or equal to 50 nm,
the first sidewall is not parallel to the third sidewall and the fourth sidewall,
the second sidewall is not parallel to the third sidewall and the fourth sidewall,
the first end wall is different than the second end wall, and
a molecular weight of the accelerator additive is less than a molecular weight of the suppressor additive; and
electroplating the copper into the recessed feature using the electroplating solution to form an electroplating layer in the recessed feature, wherein:
the electroplating layer comprises the copper and carbon,
an atomic ratio of the carbon to the copper is less than or equal to 0.1, and
the electroplating layer is free of void space.

11. The method of claim 10, wherein the molecular weight of the accelerator additive is less than a molecular weight of the leveler additive.

12. The method of claim 11, wherein a molar concentration ratio of the accelerator additive:the suppressor additive:the leveler additive is (8-15):(1.5-3):(0.5-2).

13. The method of claim 10, wherein the cross region has a depth greater than a depth of the first elongated region.

14. The method of claim 10, wherein contacting the surface of the recessed feature with the electroplating solution comprises contacting the surface with the electroplating solution prior to electroplating the copper.

15. The method of claim 10, comprising:
applying a seed layer to the surface prior to contacting the surface with the electroplating solution.

16. A method of electroplating a metal into a recessed feature, the method comprising:
contacting a surface of the recessed feature with an electroplating solution comprising metal ions, an accelerator additive, and a suppressor additive, wherein:
the recessed feature has:
a first elongated region extending between a first sidewall, a second sidewall, and a first end wall extending between the first sidewall and the second sidewall,
a second elongated region extending between a third sidewall, a fourth sidewall, and a second end wall extending between the third sidewall and the fourth sidewall, and
a cross region laterally between the first elongated region and the second elongated region,
a width of the cross region is less than or equal to 50 nm,
the first sidewall is not parallel to the third sidewall and the fourth sidewall,
the second sidewall is not parallel to the third sidewall and the fourth sidewall,
the first end wall is different than the second end wall,
a molar concentration ratio of the accelerator additive:the suppressor additive is (8-15):(1.5-3), and
the metal ions have a concentration of 10 g/L to 180 g/L in the electroplating solution; and electroplating the metal into the recessed feature using the electroplating solution to form an electroplating layer in the recessed feature, wherein:

the electroplating layer comprises the metal and carbon, an atomic ratio of the carbon to the metal is less than or equal to 0.1, and the electroplating layer is free of void space.

17. The method of claim 16, wherein a molecular weight of the accelerator additive is less than a molecular weight of the suppressor additive.

18. The method of claim 16, wherein the accelerator additive comprises pendant sulfur atoms.

19. The method of claim 16, wherein contacting the surface of the recessed feature with the electroplating solution comprises contacting the surface with the electroplating solution prior to electroplating the metal.

20. The method of claim 16, comprising:

applying a seed layer to the surface prior to contacting the surface with the electroplating solution.

* * * * *